United States Patent Office 2,720,494
Patented Oct. 11, 1955

2,720,494

PROCESS OF PREPARING CATALYTIC ELEMENTS

Harold R. Suter, Wyandotte, and Richard J. Ruff, Detroit, Mich.

No Drawing. Original application January 9, 1950, Serial No. 137,638. Divided and this application January 18, 1951, Serial No. 206,714

9 Claims. (Cl. 252—470)

This invention, relating as indicated to catalytic fume incineration, is more particularly directed to a solution of the problems occurring with the operation of industrial ovens of usual design, such ovens being employed for the drying and baking of enamels, insulating varnishes, or other surface coatings and impregnates. The presence of inflammable vapors in the oven atmosphere requires exhausting the air at a rate sufficiently high to prevent reaching the lower limit of explosibility which occasions an enormous waste of heat and at the same time creates a public nuisance when the oven exhaust is vented to the atmosphere. The odor of such vapor is not only offensive but it is in some cases harmful, particularly when operating temperatures are such that partial decomposition or oxidation occurs. The invention is not restricted to oven exhausts, but is broadly applicable to air streams containing volatile, combustible material, either for purposes of elimination of air pollution, or for utilization of heat of combustion.

The object of this invention is to provide a catalytic agent which will be useful in the combustion of combustible vapors in the exhaust gases from industrial ovens or from other processing operations.

Another object of the invention is to provide a catalyst, reactive elements of which are disposed on the surface of metallic alloys having high thermal and electrical resistance so that the necessary temperatures for optimum reactivity may be obtained through the supplying of heat by the passage of electrical currents through the metal base of the catalyst, thus making for the ultimate in energy efficiency and in precise temperature control, inasmuch as the heat is supplied at the seat of the chemical reaction without the necessity for transfer through the medium in which the reaction is occurring.

A still further specific object of the invention is to provide a method of forming a catalytic wire, ribbon, or screen, which is capable of use in removing deleterious vapors from oven exhaust streams.

Another detailed object of the invention is to provide a screen in the form of a flat panel or cylindrical member which is catalytically active to effectively remove harmful ingredients in oven exhaust streams.

The use of platinum or palladium as a catalyst for combustion of volatile materials in concentrations less than the lower limit of explosibility is old in the art. It is commonly employed in chemical analysis and in indicating or control instruments. The use of these metals or other metals from this class of elements as such in catalytically active form has been precluded by high cost from application to the purposes of this invention. This invention makes such employment of the noble metals economically practicable because of the drastic reduction in the quantity of those metals which are required. The combination of platinum or palladium or other noble metal coating in catalytically active form on a base of heat and electrically resistant metal has not been practiced heretofore as far as we are aware.

Prior practice in the elimination of volatile combustible material from exhaust streams of ovens, furnaces or other industrial processing equipment consists of several schemes. One of these is removal by incineration. Inasmuch as the concentration of combustible matter is of necessity less than the lower limit of explosibility for reasons of safety, the energy available by combustion is inadequate to maintain the combustion by flame in the gas phase, and therefore external heat must be supplied to maintain the entire gas stream at inordinately high temperatures, making this an excessively expensive procedure. For example, temperatures between 1100° F. and 1500° F. are required to oxidize hydrocarbon vapors frequently present in oven exhaust gases. Furthermore, refractory linings requiring frequent replacement must be used at considerable expense.

Another method consists of scrubbing the gas stream with water. This may partially remove volatile materials through a cooling effect producing partial condensation. This method is generally unsatisfactory because of incompleteness of removal, the large amounts of water which are required, and the formation of sludges which create another disposal problem.

Another method is the adsorption of the vapors on activated carbon, silica or other adsorbing agents. This has the disadvantage for the purposes in mind of requiring duplicate bulky equipment, it being necessary to carry on adsorption and desorption in cycles. The value of the solvents recovered is ordinarily not high enough to justify installation and operating space and cost.

The means of removal which we have developed is subject to none of these shortcomings and is believed to be a novel solution of a very acute industrial problem.

To the accomplishment of the foregoing and related ends said invention then consists of a means hereinafter fully described and particularly pointed out in the claims.

Stainless steel, Chromel and Nichrome (trade names for alloys of nickel and chromium, or nickel, chromium and iron) or any other similar heat and electrically resistant material may be used as a base metal for the catalyst. The metal in the form of wire, screen or other physical form is cleaned in a manner usually practiced in preparation of metals for electroplating. This may be done in a hot alkaline bath containing caustic soda, silicates and phosphates with surface active agents, by electrocleaning in suitable solutions or by other means well known in the art. Metallic palladium, platinum or mixtures of the two metals are deposited in catalytically active form on the base metal, either by immersion plating or by electroplating. We prefer to use palladium and to deposit it by electroplating, although we do not wish the invention to be restricted to this element and this process.

As an example, Chromel screen, wire or mat is precleaned by immersion in a hot solution of sodium orthosilicate with a surface active agent, such as a fatty acid soap, for example, sodium stearate, palmitate or oleate, or alkyl aryl sulfonate such as the sodium salt of dodecyl benzene sulfonic acid. It is thoroughly rinsed and is plated with spongy palladium in a bath containing 0.5 gram of palladium chloride per liter and 4 ml. of 37% hydrochloric acid per liter. The plating solution is operated at 160 to 170° F. and the current density is such that a uniform coating of spongy palladium approximately 0.5 millimeter in thickness is deposited within one to three minutes. Pure graphite anodes may be used, or alternatively metallic palladium anodes which will serve to replenish palladium to the solution. After plating, the catalyst is carefully rinsed free of soluble materials and is heated to approximately 600° F. in an air stream containing volatile hydrocarbons such as hexane or other hydrocarbon fractions in concentrations less than the lower limit of explosibility, whereupon surface combustion takes place, thus conditioning the palladium coating for service and increasing its tenacity to the base metal.

As a second example, the Chromel or Nichrome wire, screen, or mat is precleaned as before and immersed at 180° F. in a solution containing 0.8 gram per liter of palladium chloride and 6 ml. of 37% hydrochloric acid per liter. The solution is agitated gently for a period of up to three or four minutes or until the surface of the metal is uniformly coated with amorphous palladium. No electric current is applied, the deposition occurring by replacement of palladium by nickel and/or chromium which slowly dissolves from the base metal. The catalyst is rinsed and conditioned for service as in the previous example.

Although either procedure may be used, electrodeposition is preferred inasmuch as it prevents dissolution of the base metal, which can contaminate and inactivate the catalytic surface if the bath is used repeatedly.

Mixtures of platinum and palladium chlorides may be used, which will result in greater tenacity of the active coating to the base metal, and greater resistance to extreme high temperatures.

Palladium chloride concentration up to 10 grams per liter can be used, and hydrochloric acid concentration up to 10 grams per liter. Temperatures on the order of 170° F. have been found to produce structures with optimum catalytic activity, although it is possible to obtain active deposits at all solution temperatures from the freezing point to the boiling point. Current density, temperature, palladium or platinum concentration and acidity are all interrelated, and the choice of conditions is partly dictated by the base metal used. Increasing the acidity, or the temperature will increase the rate of attack on the base metal by the acid in the solution, and thus the rate of deposition of noble metal by replacement. In electroplating, for a given set of conditions, the current density should be such that evolution of hydrogen, either by attack of the metal by acid or by electrodeposition from solution does not occur. At the proper conditions a uniform, adherent coating approximately 0.5 mm. in thickness will be deposited in a period of five minutes or less. In the event of the use of graphite anodes, chlorine which is evolved should be prevented from diffusing into the cathode zone by means of porous membranes. By following these general directions, one skilled in the art will be able to duplicate our results.

As an example of the performance of catalyst screens or assemblies prepared as directed, following is a set of typical data obtained by means of a small scale test unit which provided means of passing heated air, into which naphtha was vaporized in controlled amounts, through a catalyst assembly. Temperatures were measured by means of thermocouples inserted in the entering and exit air streams and in contact with the catalyst, and air samples before and after passage through the catalyst were withdrawn for analysis by conventional methods. The catalyst assembly consisted of two 16-mesh screens and one 80-mesh screen, the first 16-mesh screen being fitted with electrical connections for direct resistance heating. The entering air contained hydrocarbon vapor in such concentration that the heat released on complete combustion amounted to 37 British thermal units per cubic foot, and was maintained at a temperature of 300° F. It was passed through the catalytic element at the rate of 300 feet per minute. On starting the air flow, electric current was passed through the primary screen so as to heat it to 900° F., and after surface combustion was initiated this current was stopped. On reaching a steady condition the primary screen temperature was 900° and the second and third screens at higher temperatures. Samples were withdrawn and analyzed for carbon dioxide before and after complete combustion using conventional analytical techniques. Complete combustion was accomplished in the passage through the catalyst under the conditions stated, as evidenced by identical carbon dioxide content in the exhaust gas sample before and after subjecting to quantitative combustion in the analytical apparatus. The exhaust gas had no preceptible odor.

As a second example, in a small commercial unit having a catalyst assembly consisting of two 16-mesh screens, between which is packed wire, air passed through the unit at a rate of 100 linear feet per minute, the entry air being at a temperature of 500° F. and containing combustible solvent such that the heating value was 5.5 B. t. u. per cubic foot. The exhaust air was at a temperature of 900° F. and was free from odor. No gas or electrical heating was used.

While we have described the preferred embodiment of our invention, we wish it to be understood that we do not confine ourselves to the precise details of processes herein set forth, by way of illustration, as it is apparent that many changes and variations may be made therein by those skilled in the art, without departing from the spirit of the invention or exceeding the scope of the appended claims.

This application is a division of our co-pending application, filed January 9, 1950, Serial No. 137,638, "Catalytic Fume Incinerator," now issued as Patent No. 2,658,742, November 10, 1953.

We claim:

1. A process of preparing catalytic elements which comprises the steps of, cleaning a metallic base element, selected from the group consisting of an alloy of nickel and chromium and an alloy of nickel, chromium, and iron, then rinsing, then depositing a coating of a noble metal, selected from the group consisting of platinum, palladium, and mixtures thereof, upon said base element, then rinsing, then heating the resulting composite element in an air stream containing combustible vapors, in concentrations less than the lower limit of explosibility thereof, and at a temperature to cause surface combustion to take place, thus conditioning the coating of noble metal for service as a catalyst and increasing the strength of the bond between the coating and the base.

2. A process as set forth in claim 1 wherein the metallic base element is formed of an alloy, selected from the group consisting of (a) Ni and Cr, and (b) Ni, Cr, and Fe, that is resistant to high temperatures and to passage of electrical currents.

3. A process as set forth in claim 2 wherein the composite element is heated to a temperature of approximately 600° F. in said air stream.

4. A process as set forth in claim 1 wherein said cleaning comprises immersing said metallic base element in a hot solution of sodium orthosilicate and a surface active agent.

5. A process as set forth in claim 1 wherein said step of depositing a coating of noble metal comprises electrolytically coating said base element in a bath containing up to 10 grams of palladium as palladium chloride per liter and up to 10 ml. of 37% hydrochloric acid per liter at a current density sufficient to produce a coating of spongy palladium approximately 0.5 millimeter in thickness in less than ten minutes.

6. A process as set forth in claim 5 wherein said coating is produced in from 1 to 10 minutes and the solution is maintained from about 160° F. to about 170° F.

7. A process as set forth in claim 1 wherein said step of depositing a coating of noble metal comprises electrolytically coating said base element in a bath containing up to 10 grams of platinum as platinum chloride per liter and up to 10 ml. of 37% hydrochloric acid per liter at a current density sufficient to produce a coating of spongy platinum approximately 0.5 millimeter in thickness in less than ten minutes.

8. A process as set forth in claim 1 wherein said step of depositing a coating of noble metal comprises electrolytically coating said base element in a bath containing up to 10 grams of a mixture of palladium and platinum as a mixture of palladium and platinum chloride per liter and up to 10 ml. of 37% hydrochloric acid per liter at a current density sufficient to produce a coating of a spongy mixture of palladium and platinum approximately 0.5 millimeter in thickness in less than ten minutes.

9. An article of manufacture comprising a base element and a coating of a noble metal, said coating being selected from the group consisting of platinum, palladium, and mixtures thereof, said base element being selected from the group consisting of an alloy of nickel and chromium and an alloy of nickel, chromium, and iron, such alloy being highly resistant to heat and also highly resistant to the transmission of electrical currents, said coating being a spongy, porous, amorphous mass to provide a catalytic surface.

References Cited in the file of this patent

UNITED STATES PATENTS

| | | |
|---|---|---|
| 1,947,545 | Pugh | Feb. 20, 1934 |
| 2,134,906 | Byron | Nov. 1, 1938 |
| 2,282,097 | Taylor | May 5, 1942 |
| 2,497,110 | Williams | Feb. 14, 1950 |
| 2,543,708 | Rice et al. | Feb. 27, 1951 |

FOREIGN PATENTS

| | | |
|---|---|---|
| 426,251 | Great Britain | Mar. 29, 1935 |